United States Patent [19]

Cheng et al.

[11] Patent Number: 5,434,489
[45] Date of Patent: Jul. 18, 1995

[54] METHOD AND SYSTEM FOR PATH PLANNING IN CARTESIAN SPACE

[75] Inventors: Sai-Kai Cheng, Rochester Hills; Chi-Keng Tsai, Bloomfield Hills, both of Mich.

[73] Assignee: FANUC Robotics North America, Inc., Auburn Hills, Mich.

[21] Appl. No.: 100,475

[22] Filed: Jul. 30, 1993

[51] Int. Cl.6 .............................................. G05B 19/42
[52] U.S. Cl. ............................ 318/568.15; 318/568.19; 318/573
[58] Field of Search ..................... 318/568.15, 568.16, 318/568.18, 568.19, 571, 573, 574, 615, 616, 618, 636; 364/474.29, 474.3, 474.31; 395/87

[56] References Cited

U.S. PATENT DOCUMENTS

| | | | |
|---|---|---|---|
| 4,554,497 | 11/1985 | Nozawa et al. | 318/636 |
| 4,598,380 | 7/1986 | Holmes et al. | 364/513 |
| 4,603,286 | 7/1986 | Sakano | 318/615 |
| 4,623,971 | 11/1986 | Ailman et al. | 364/513 |
| 4,706,003 | 11/1987 | Nakashima et al. | 318/636 X |
| 4,706,204 | 11/1987 | Hattori | 364/513 |
| 4,746,251 | 5/1988 | Yoshikawa et al. | 318/578 X |
| 4,772,831 | 9/1988 | Casler, Jr. et al. | 318/574 X |
| 4,773,025 | 9/1988 | Penkar et al. | 364/513 |
| 4,774,445 | 9/1988 | Penkar | 318/567 X |
| 4,894,596 | 1/1990 | Hara | 318/568.1 |
| 5,028,855 | 7/1991 | Distler et al. | 318/573 X |
| 5,057,756 | 10/1991 | Hara | 318/569 |
| 5,073,748 | 12/1991 | Boehm | 318/603 |
| 5,140,236 | 8/1992 | Kawamura et al. | 318/573 X |

*Primary Examiner*—William M. Shoop, Jr.
*Assistant Examiner*—Brian Sircus
*Attorney, Agent, or Firm*—Brooks & Kushman

[57] ABSTRACT

Method and system for trajectory or path planning to move a device such as a robot along a Cartesian path to achieve high path accuracy and ease of programming. Cascaded linear filters are utilized to perform acceleration/deceleration control in Cartesian space having six Cartesian components. Generally, six sets of such linear filters are used, three for location components and three for orientation components. Cartesian path blending is also provided. First and second path segments are planned and blended together and a corner distance is formed at a transition between the first and second path segments. A method is also provided for adjusting the corner distance. The corner distance is adjusted by corner distance variables which are independent of program speed so that the resultant Cartesian path can be maintained regardless of program speed changes.

16 Claims, 5 Drawing Sheets

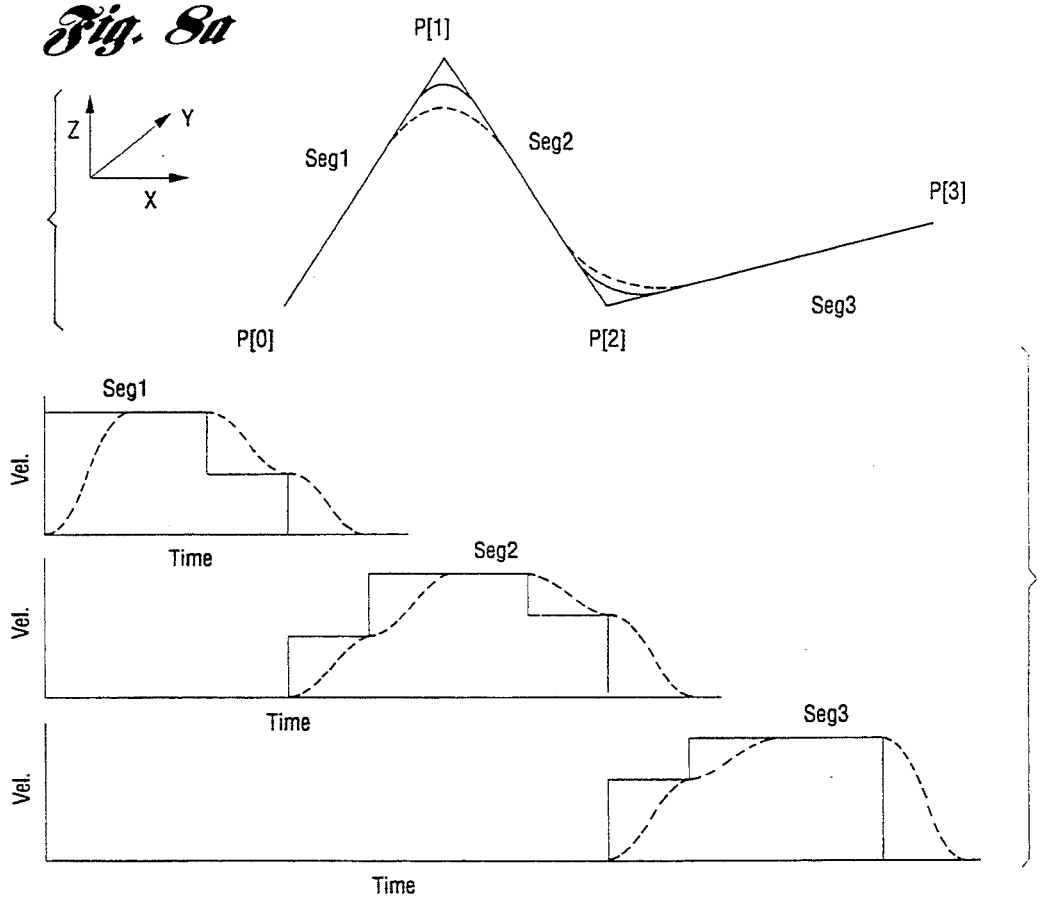
Fig. 8a
Fig. 8b
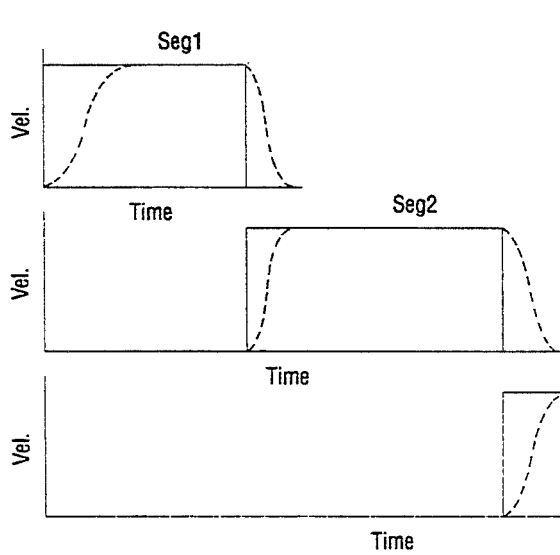
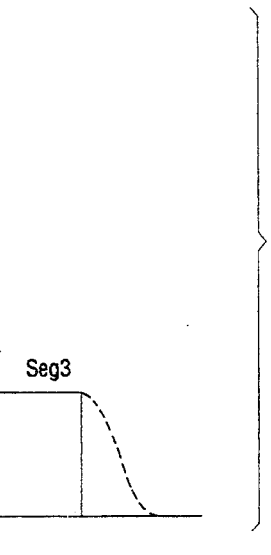
Fig. 8c

METHOD AND SYSTEM FOR PATH PLANNING IN CARTESIAN SPACE

TECHNICAL FIELD

This invention relates to methods and systems for path planning in Cartesian space and, in particular, to methods and systems for path planning in Cartesian space to control the path of a device, such as a robot.

BACKGROUND ART

In a number of robotic applications, such as sealing, water jet cutting, etc., it is important to maintain Cartesian path accuracy and an easy means for the user to adjust the shape of the path.

These objectives may be achieved using the spline method in general, whereby spline segments are smoothly connected to form a continuous smooth path. From a practical point of view, such implementation has the following shortcomings—(i) it is computationally intensive, (ii) spline path modifications are not intuitively clear to the general user, (iii) spline methods are formula based and hence not robust in the event of error recovery of holding and resuming robot motions where planned formulas cannot be used and new formulas need to be dynamically generated, etc. Consequently, the spline method for robust path interpolation is not common in most industrial robot controllers.

On the other hand, almost all industrial controllers provide linear and circular path interpolation. For continuous path motion, it is required to blend between linear/circular segments and there are various ways to achieve this. By far, the most common methods are based on polynomial interpolation (usually third order) between the linear/circular segments. Since it is formula-based, it suffers the same robustness problem as mentioned above. Usually the user has no direct control over the corner blending between segments. As a result, to modify path corners, the user typically has to teach many points around the corner. This is a trial and error process. It is usually made worse by the fact that as speed changes, the path changes on most controllers.

In an industrial environment, it is common for the user to run the same robot program at different speeds for a variety of reasons. For most industrial robot controllers currently available, when the program speed is changed, the robot path changes also. In order to maintain the same robot path as program speed changes, typically taught robot positions need to be touched up (adjusted) and/or new taught positions need to be added. This is a tedious process.

U.S. Pat. No. 5,140,236 to Kawamura et al discloses a method of trajectory planning based upon the creation of a cubic spline interpolation of preset path points.

U.S. Pat. No. 5,028,855 to Distler et al discloses a spline interpolation method of effecting an approximate interpolation of a spline curve based upon preset path points among a sequence of given path points.

In addition, U.S. Pat. No. 4,598,380 to Holmes et al, U.S. Pat. No. 4,623,971 to Ailman et al and U.S. Pat. No. 4,706,204 to Hattori et al describe path planning methods based upon the linear path interpolation between preset path points.

Further, U.S. Pat. No. 4,772,831 to Casler et al, U.S. Pat. No. 4,773,025 to Penkar et al and U.S. Pat. No. 4,774,445 to Penkar describe a trajectory planning method which generates interpolated position commands for each of the feedback control loops along the preset path segment in accordance with a predefined type of path move and in accordance with the time profile applicable to the preset path segment. Execution of a continuous path routine in the planning program provides for computation of coefficients for a stored polynomial equation to enable the position commands to be generated in joint and Cartesian moves as tool orientation and tool position commands that produce smoothed robot tool motion.

U.S. Pat. No. 4,554,497 to Nozawa et al and U.S. Pat. No. 4,706,003 to Nakashima et al describe a method of acceleration/deceleration control using a linear filter cascaded with an exponential filter. The method addresses acceleration/deceleration control in axis space only as opposed to true six (6) degree of freedom Cartesian space. For a true articulated robot arm capable of reaching full Cartesian positions, performing path interpolation with acceleration/deceleration control in joint axis space leads to path deviations, that the resultant Cartesian robot path traced by the robot will not follow the path specified by the user.

SUMMARY OF THE INVENTION

An object of the present invention is to provide a method and system for path planning in Cartesian space wherein a simple and robust means of controlling corner blending between linear/circular path segments is provided. To achieve this, a novel technique is used to achieve smooth acceleration/deceleration. This technique is non-formula based, and is very robust and versatile. With this technique, corner rounding between consecutive path segments can be blended "naturally" without resorting to spline or other formula-based curve fitting methods. This invention is also very efficient computationally.

Another object of the present invention is to provide a method and system for path planning in Cartesian space which are easy to use. The invention allows the user to adjust the amount of corner rounding without having to reteach taught points. Two means are provided for corner adjustments, (1) a global means that affect the entire robot program and (2) a local means that affect just a particular motion line in a program.

Still a further object of the present invention is to provide a method and system for path planning in Cartesian space which maintains the same robot path (once the corner adjustments are done) regardless of program speed changes.

In carrying out the above objects and other objects of the present invention, a method is provided for planning a path for a device in Cartesian space having a plurality of Cartesian components. The device is movable along axes defining an axis space. The method includes the step of receiving a first motion command from a user program. The motion command has desired motion-type information in the Cartesian space. The motion command also has position and velocity information. The position, velocity and motion-type information define a desired path. The method also includes the steps of setting a constant velocity parameter based upon the velocity information, and planning a set of interpolation parameters based on the position, velocity and motion-type information and based upon the constant velocity parameter. The method further includes the step of computing a plurality of intermediate Cartesian positions including location and orientation components based upon the interpolation parameters. The intermediate Cartesian positions are on the desired path. The method finally includes the steps of transforming the orientation components of the intermediate Cartesian positions into transformed orientation components, smoothing the location components and the transformed orientation components into smoothed transformed orientation components, inverse transforming the smoothed transformed orientation components into inverse transformed orientation components, and generating a plurality of commands in the axis space based upon the smoothed location components and the inverse transformed orientation components.

Preferably, the step of smoothing is accomplished with a plurality of cascaded linear filters, each of the cascaded linear filters corresponding to a respective Cartesian component.

Further in carrying out the above objects and other objects of the present invention, a system is provided for carrying out each of the above method steps.

The method and system may be used to smoothly blend path segments in Cartesian space. Based on this blending technique, corner rounding between path segments can be adjusted by adjusting the speed and/or filter lengths during blending with the same given positions (i.e., no change in user taught positions).

Corner adjustment can be done globally to affect the entire program by specifying corner speed or corner distance. Corner adjustment can also be done locally to affect a line of motion statement within the program by specifying corner tolerance in percentage or corner distance. This method of corner adjustment is not dependent on program speed. Consequently, the same Cartesian path can be maintained even when program speed changes.

In summary, the method and system of the present invention overcome the shortcomings of the prior art as follows:

1) applies to the most commonly supported motion types in industrial controllers, i.e. linear and circular motion types;
2) is a simple and robust means of performing acceleration/deceleration control in Cartesian space providing good path accuracy. It is very efficient computationally. It is non-formula based, and handling the event of holding and resuming robot motion with ease;
3) is a versatile means of adjusting the corner blending between path segments. Both global means and local means of corner controls using 1 variable respectively is provided, and the path adjustment procedure is intuitively clear to the user; and
4) maintains the same Cartesian path regardless of program speed changes. This can be accomplished with very little computation, hence it is simple, fast and robust.

Preferably, cascaded linear filters are used for smoothing true Cartesian signals for Cartesian space acceleration/deceleration control. The method and system of the present invention apply to all articulated robots without any restriction to joint axes configurations.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 7a specifically shows the velocity inputs (solid lines) and velocity outputs (dashed lines) of one of the cascaded filters versus time; FIG. 7b specifically illustrates the resultant Cartesian path generated (solid line); and FIGS. 8a–8c collectively illustrate three different path segments; FIG. 8a specifically shows a Cartesian path with taught positions P[0] to P[3] forming three linear segments, and two cases of corner rounding paths that can be generated; the dashed corner represents the corner obtained with straight forward path blending using cascaded linear filters; the solid corner illustrates an example of corner adjustment that can be obtained (i) by adjusting the velocity inputs to the cascaded filters as illustrated by FIG. 8b or (ii) by dynamically adjusting the lengths of the cascaded filters as illustrated by FIG. 8c.

BEST MODE FOR CARRYING OUT THE INVENTION

Figure 1:
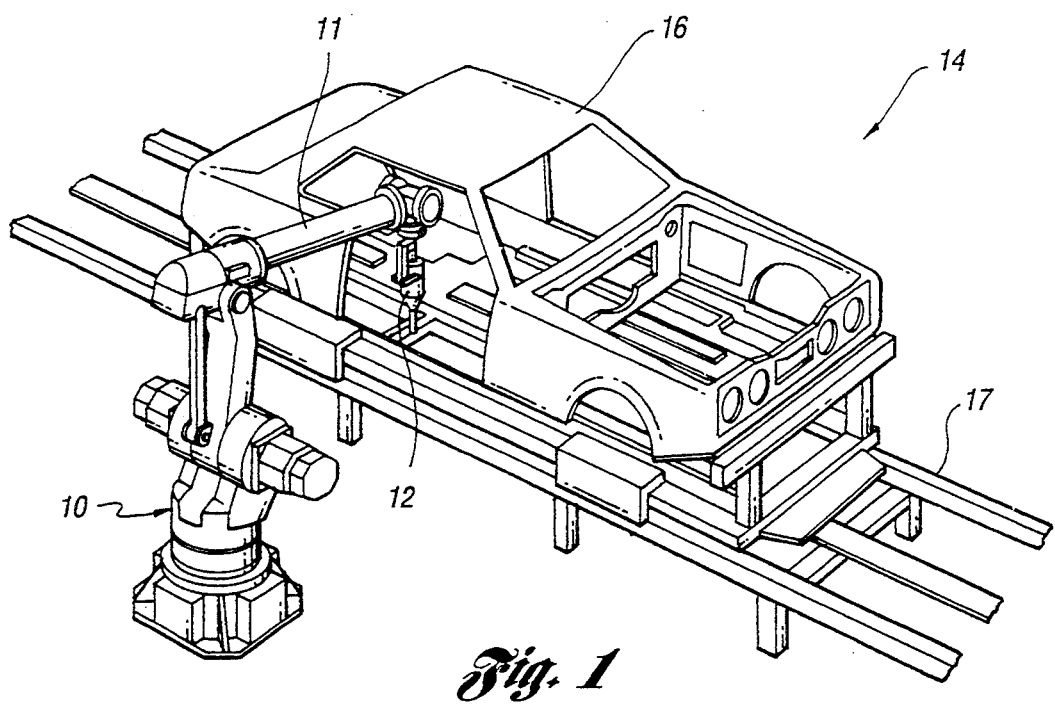
FIG. 1 is a schematic view showing a typical sealing station including an industrial sealing robot.

Referring now to the drawing figures, there is illustrated in FIG. 1 an industrial sealing robot 10 having an arm 11 equipped with a sealant dispenser 12 at a sealing station, generally indicated at 14. A car body 16 is located on a track 17 and the sealant dispenser 12 dispenses sealant on the car body 16 in a controlled fashion.

Figure 2:
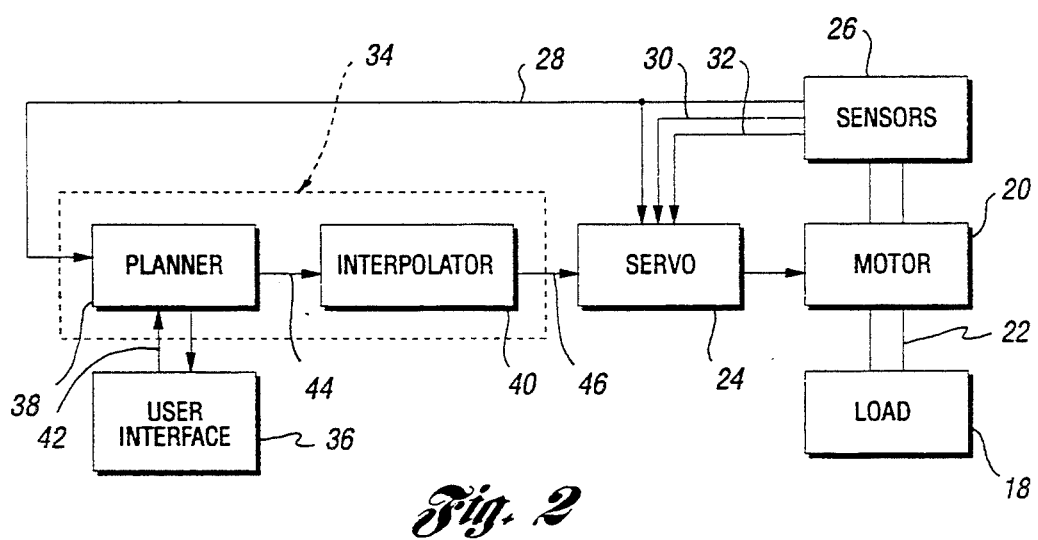
FIG. 2 is a schematic block diagram of a computer-based servo system in accordance with the invention.

Referring to FIG. 2, the reference numeral 18 schematically designates a positionable member or load of a servo system according to this invention. The positionable member 18 could take the form of the robot arm 11 and the sealant dispenser 12, as in the illustrated embodiment, or any other position-controlled member. A conventional AC servo motor 20 is rigidly coupled to the positionable member 18 via a shaft 22 and is adapted to be energized by a servo controller 24 for effecting movement of the load 18. The motor 20 is also coupled to one or more sensors 26, including a position feedback sensor such as a resolver or optical encoder, which provides an electrical signal indicative of the motor position on a line 28, motor velocity on a line 30 and motor acceleration on a line 32. Alternatively, one or more of the sensors 26 can be replaced as long as the appropriate position, velocity and acceleration signals are generated.

The reference numeral 34 generally designates a computer-based control unit according to this invention for controlling the output voltage of the servo controller 24 so as to move the load 18. The control unit 34 represents an aggregate of conventional elements, including a central processing unit, a crystal controlled clock, read-only and random-access memory, digital and analog input/output ports and D/A and A/D converter channels. The control unit 34 also supports a user interface 36, which may include a teach pendant and/or a video display terminal, to facilitate operator input of commanded positions and system parameters.

The control unit 34 can also be viewed as including a path or trajectory planner 38 and an interpolator 40. The planner 38 receives a correct position of the load 18 on the line 28 and a command or destination position signal on a line 42 from the user interface 36. In turn, the planner 38 outputs trajectory parameters on a line 44 to the interpolator 40. The interpolator 40 takes the trajectory parameters, performs path interpolation and outputs smoothed joint command on a line 46 to the servo controller 24.

Two key components of this invention are disclosed in the following sections: (1) Cartesian acceleration/deceleration control and (2) corner control between path segments.

Acceleration/Deceleration Control

Figure 3A:
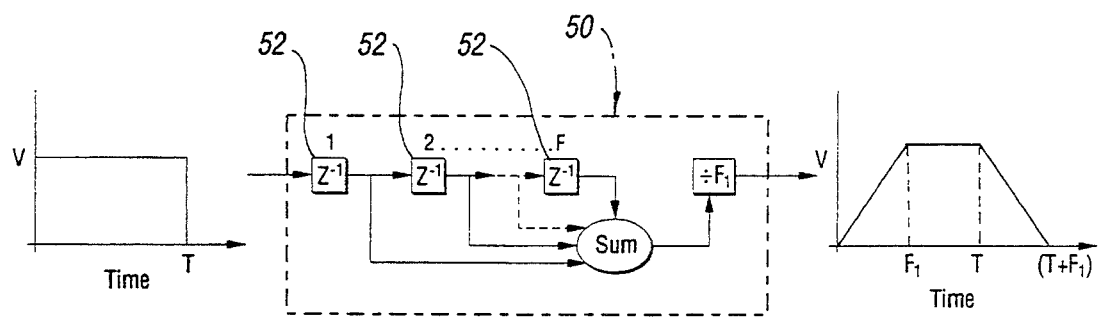
FIG. 3a is a schematic diagram of a linear filter with inputs and outputs illustrated graphically.

A simple but robust way of achieving smooth motion along a path segment is first described. The basic building block is a simple linear filter 50 as shown in FIG. 3a. It is a digital integrating filter of finite length F1. The filter 50 itself is preferably embodied as a shift register 52 whereby when a new value is input into the filter 50, all values are shift down by 1 step, and the last value is shifted out of the filter 50. The shift register 52 is shown in FIG. 3a by the delay operator, $z^{-1}$, where $y(k) = z^{-1}u(k)$ means that $y(k) = u(k-1)$, and k denotes discrete time steps. The output of the filter 50 is computed as the sum of all the outputs of the shift registers (F1 of them) divided by its length F1, as shown in FIG. 3a. The linear filter 50 is a Finite Impulse Response (FIR) digital filter. That is, its impulse response is of finite duration which is equal to the length of the filter. Hence, with a constant input signal of magnitude V and duration T as shown in FIG. 3a, the output signal ramps up linearly to V at time F1, and thereafter maintains at the same value V up to time T, then ramps down linearly to 0 at time (T+F1).

By cascading two or more of these filters 50 each with finite lengths, the overall filter can be used to construct a simple and yet robust acceleration/deceleration scheme for robot path planning and interpolation. By cascading, it is meant that the output of the first filter becomes the input to the second filter and so on, with the same rules as described above applied to each filter. The overall cascaded filter is still an FIR filter.

Figure 3B:
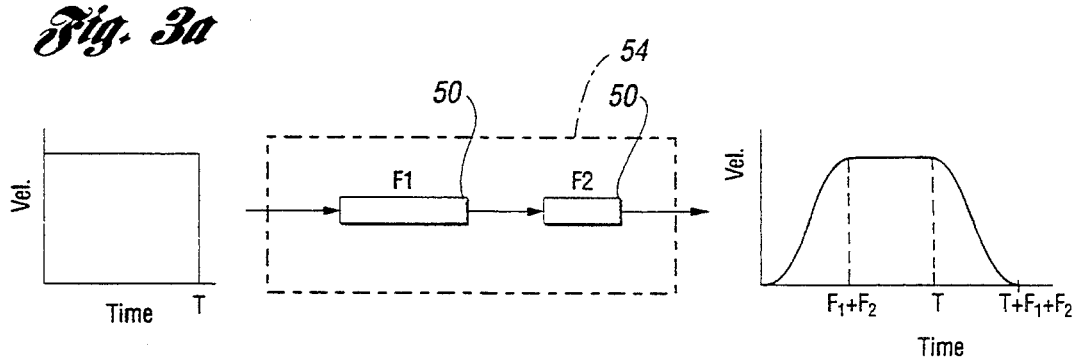
FIG. 3b is a schematic block diagram of two cascaded linear filters with inputs and outputs illustrated graphically.
Figure 4A:
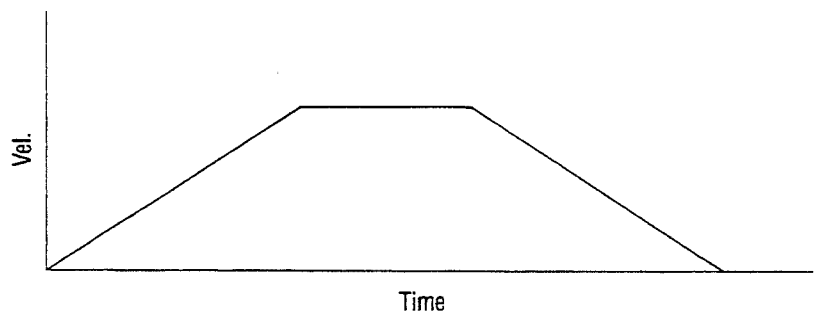
FIGS. 4a–4c are graphs of different motion profiles generated with a two stage filter having the same F1+F2 but with F2=0, F1=F2 and F1=2F2, respectively.
Figure 4B:
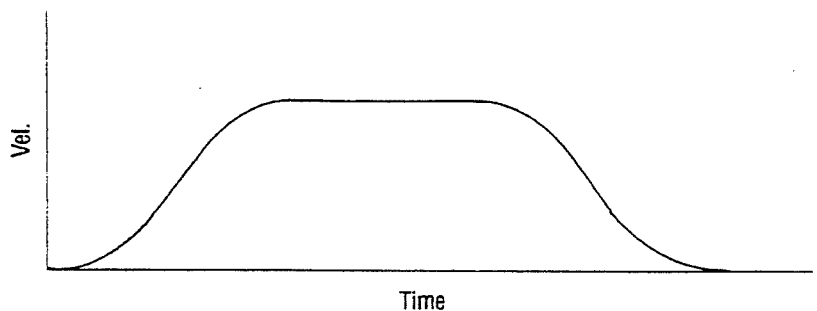
Figure 4C:
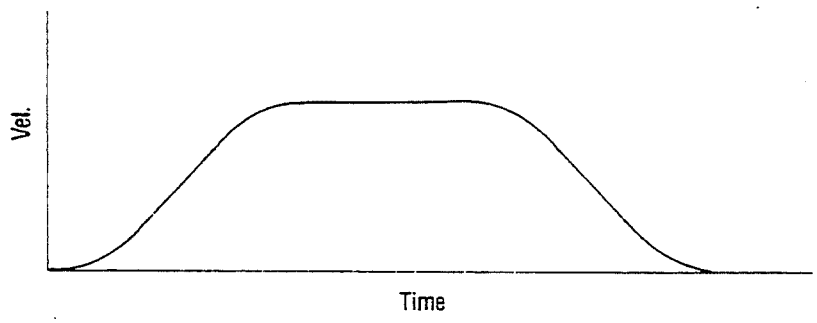

For clarity, the following description uses a two stage linear filter, simply referred to as filter 54 as illustrated in FIG. 3b. It is trivial to extend these concepts to stages more than two. Denoting the length of each stage by F1 and F2 respectively, the sum F1+F2 represents the total acceleration time which is also the total deceleration time. With this technique, by simply inputting constant values into the filter, a smooth output profile can be generated. One way to utilized this technique in motion control is to input a constant velocity profile into the filter, as shown in FIG. 3b. The output velocity profile is second order smooth, giving rise to a third order smooth position profile. By controlling the ratio of F1 and F2, various velocity profiles can be obtained, as shown in FIGS. 4a-4c wherein F2=0, F1=F2 and F1=2F2, respectively.

Once F1 and F2 are defined, the filter is simply a black box that maps a given input value into an output value. During deceleration, input values are zero. Hence to hold a robot while in motion, one simply inputs zeros into the filter. There is no need to recompute the deceleration profiles dynamically while the robot is in motion. Since what goes into the filter will eventually come out, to resume a stopped motion, one simply continues to input into the filter whatever was left before, again without having to replan the motion. This leads to a very simple but robust error recovery method which is of practical importance in an industrial environment.

Cartesian Acceleration/Deceleration

By performing acceleration and deceleration control in Cartesian space, it is then possible to interpolate intermediate positions to lie on the Cartesian path specified by the user, thus giving rise to good path accuracy, i.e. the actual path traced by the robot has no or little path deviation from the user specified Cartesian path. This is the main motivation for performing acceleration and deceleration control in Cartesian space. A Cartesian position has six degree of freedom in general, three for location and three for orientation. The main issues to be resolved in Cartesian acceleration/deceleration control is how the algorithm handles (i) smooth orientation interpolation, and (ii) smooth location and orientation transition without stopping the robot from one Cartesian path segment to the next, especially for a sequence of very short segments. These issues are addressed by the following novel approach to Cartesian acceleration/deceleration control, which is both robust and computationally efficient.

Figure 5A:
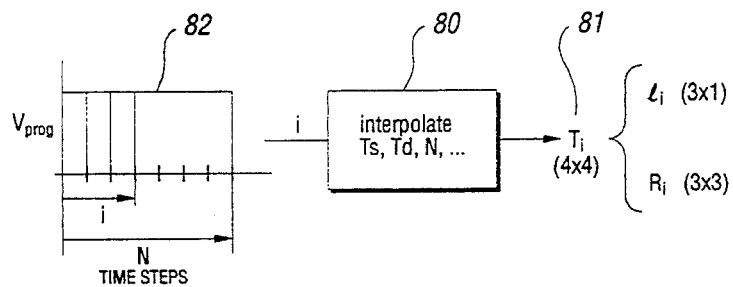
FIGS. 5a–5c are block diagrams which describe the details of performing Cartesian acceleration/deceleration control.
Figure 5B:
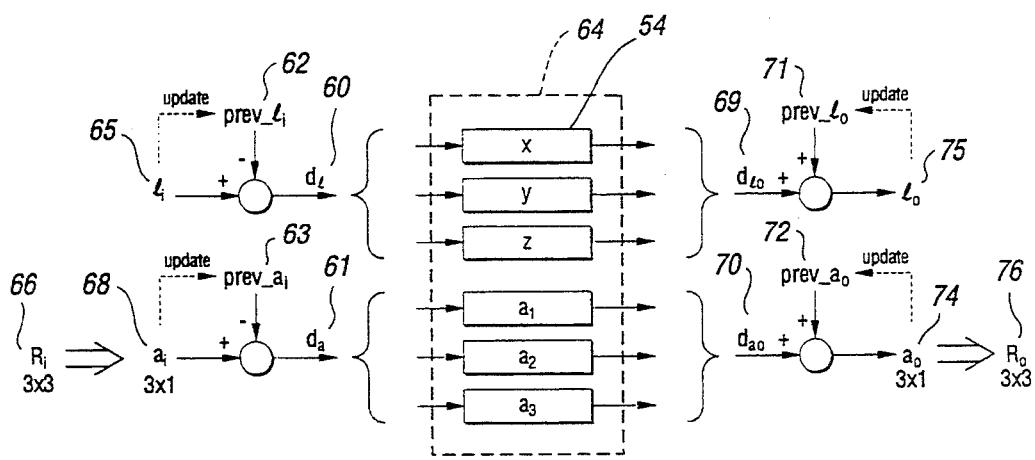
Figure 5C:
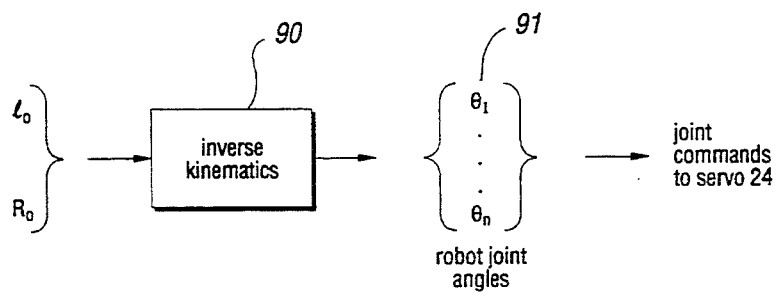

The main idea is summarized in FIGS. 5a-5c which shows the details of the interpolator 40 where Cartesian acceleration/deceleration control and corner control are carried out. The approach utilizes one set of the cascaded linear filter 54 for each Cartesian component. For location part, 3 sets of filters are required, one for each of the x, y, z components. For orientation part, if it is represented in 3 components then 3 sets of filters are required (as shown in FIGS. 5a-5c).

Consider moving along a straight line from a start position, $P_s$, to a destination position, $P_d$. As explained in detail in the section entitled "Planning" below, the planner 38 basically computes (i) the number of interpolation time steps N required to move from $P_s$ to $P_d$ with the specified program velocity, $V_{prog}$, and (ii) the location and orientation path interpolation parameters for interpolating from $P_s$ to $P_d$.

At each interpolation step i, the output joint command to the servo controller is computed as follows:
  Based on the ratio (i/N) and interpolation parameters, compute the intermediate Cartesian position, as represented by block 80 in FIG. 5, $T_i$ at 81 (4×4 homogeneous transform representation in world coordinate). The detail of block 80 is explained in the section entitled "Interpolation" below.
  The next step is to compute the Cartesian increments at 60 and 61 based on $T_i$ and the previous Cartesian positions at 62 and 63. It is the Cartesian increments which are smoothed by using cascaded linear filters 64 and not the Cartesian positions directly. Furthermore, the orientation part $R_i$ at 66 is handled by converting the $3 \times 3$ orientation transform into an equivalent $3 \times 1$ orientation vector at 68 (details are described in "Planner" section below). In other words, $T_i$ is separated into its location part $l_i$ at 65 and its orientation part $R_i$, which is then converted into an equivalent orientation vector $a_i$ at 68.

The Cartesian increments $d_1$, at 60, and $d_a$, at 61, are then obtained by subtracting $l_i$ from prev$\_l_i$, and $a_i$ from prev$\_a_i$ respectively. Once the Cartesian increments are computed, prev$\_l_i$ is then updated to $l_i$ and prev$\_a_i$ is then updated to $a_i$ in preparation for the next interpolation cycle.

A total of 6 cascaded linear filters 64 are used, one for each Cartesian increment component. The Cartesian increments at 60 and 61 are then input into the set of filters 64 to obtain smoothed Cartesian increment outputs $d_{lo}$, at 69, and $d_{ao}$, at 70.

Next, the smoothed Cartesian increment outputs are added to their previous values prev$\_l_o$, at 71, and prev$\_a_o$, at 72, to obtain the total Cartesian position $l_o$, at 75, and $a_o$, at 74. prev$\_l_o$ is then updated to $l_o$ and prev$\_a_o$ is then updated to $a_o$ in preparation for the next interpolation cycle.

$a_o$ is then converted from $3 \times 1$ orientation vector format back into $R_o$ at $3 \times 3$ orientation transform 76.

Together $l_o$ and $R_o$ becomes the smoothed output Cartesian position of interpolation step i.

Based on Cartesian position $l_o$ and $R_o$, inverse kinematics at 90 is then computed to obtain robot joint angles $\theta_1$ to $\theta_n$ at 91 (where n is the number of robot axes), which becomes the joint axis commands to the servo 24.

Initial values of prev$\_l_i$, prev$\_a_i$, prev$\_l_o$ and prev$\_a_o$ are set to the physical robot Cartesian position during calibration (as part of the power start up sequence).

Key Features of the Method

A key feature of the method of the present invention is that it can handle different orientation interpolation schemes with ease. Indeed, various orientation control schemes (3such schemes are explained in the "Planner" section below) can be used to compute $R_i$, at 66. Regardless of how $R_i$ is computed, it is converted into an equivalent $3 \times 1$ vector representation $a_i$, at 68, and smoothing is then performed on the increments and the output $3 \times 1$ vector representation is finally converted back into $3 \times 3$ orientation transform giving the desired orientation control.

The method presented is a true Cartesian space acceleration/deceleration control technique in that smoothing is done in Cartesian space without regard to robot kinematics. And robot kinematics is only applied after a smoothed output Cartesian position is obtained. Furthermore, the complete Cartesian position, i.e., full 6 degrees of freedom consisting of both location and orientation parts, are taken into account, not just a subset of the degrees of freedom. Consequently, the method is very general and can be applied to all robots regardless of their joint axes configuration.

The method simplifies the path planning and path interpolation process. Because only the input side of the filter is considered, once the input is determined, the filter set 64 will take care of the rest. Furthermore, the input signal does not have to be smooth, it can be step signals, since the filter will smooth it out. Together, these features lead to a very straightforward Cartesian path planning and interpolation process. During planning, one plans a constant speed profile (see "Planner" section for details) with N time steps. During runtime interpolation, at interpolation step i, one simply uses the ratio (i/N) to compute the intermediate Cartesian transform Ti (see "Interpolation" section for details). The rest are handled by running through the filter to finally obtain a set of joint commands.

With the method of the present invention, there is no need to explicitly plan and interpolate a smooth acceleration and deceleration Cartesian profile. It is non-formula based which makes it very robust and practical. For example, deceleration can be achieved very easily by inputting 0 into each filter in 64. There is no need to explicitly compute the Cartesian deceleration profile. This leads to a very simple robust error recovery scheme whereby it is required to hold the current robot position and resume it at a later time.

With the present method, to hold the current robot motion, one simply stops incrementing the interpolation step i at 80 (that is there is still (N−i) input time steps left), and input 0 into the filter 64 thereafter. When instructed to resume the motion, one just picks up from where one leaves off by incrementing to the next interpolation step and continues the process as described, as though nothing has happened. There is no need to replan the held motion, and there is no need to compute the Cartesian deceleration profile while holding and the Cartesian acceleration profile when resuming the subsequent motion. This simple and robust way of handling motion exception is a very useful feature in practical industrial robot applications.

Figure 7A:
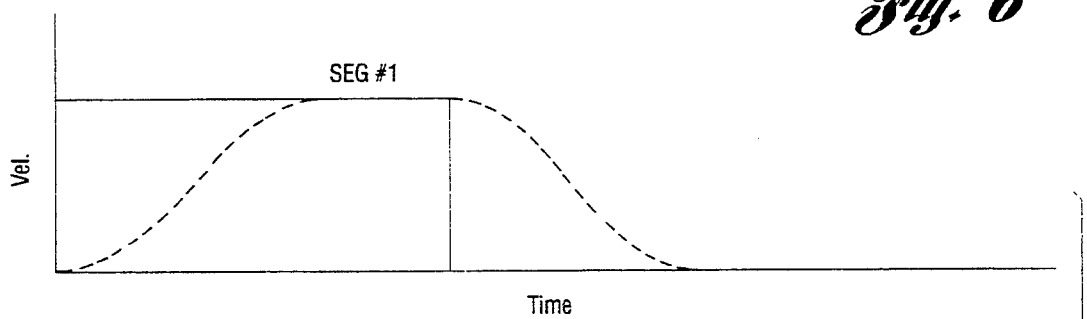
FIGS. 7a and 7b collectively illustrate a method of smoothly blending linear segments of a robot path.
Figure 7A:
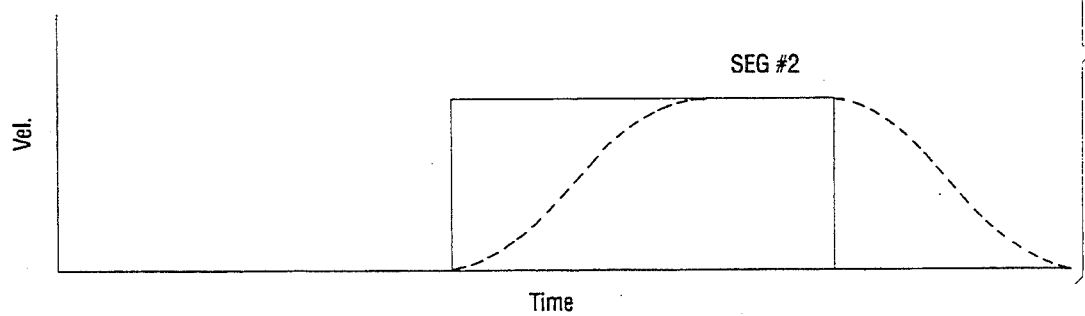
Figure 7B:
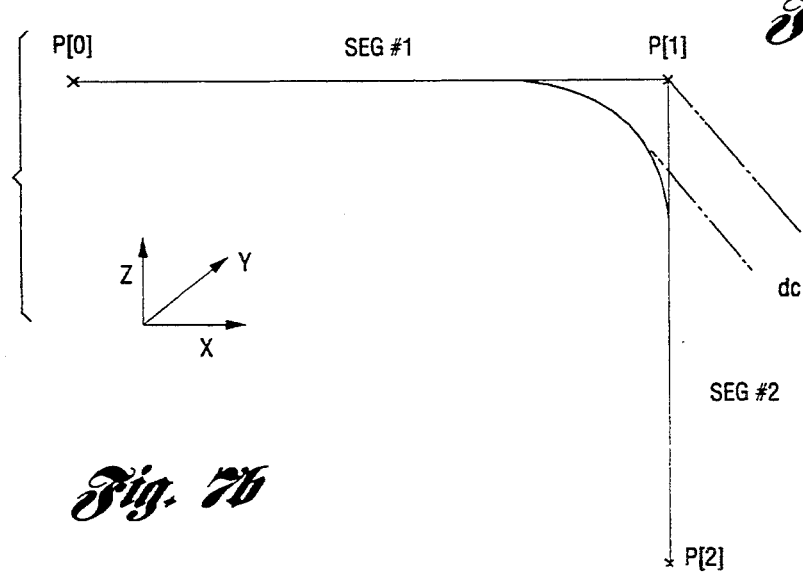

The method also leads to a very simple way of achieving smooth transition from one path segment to the next. In fact, it is all handled by the cascaded filter set 64 automatically. For example, FIG. 7b shows two linear segments where it is desired to move from one segment to the next without stopping. The blending between these linear segments can be achieved as follows.

Each segment is planned independently. That is, there is no need to look ahead to the next segment in order to achieve smooth path transition. In fact, the same planning and interpolation processes as described above are carried out. By design, the inputs to the filer has the same reference frame, that is the same unit, going from one path segment to the next, hence one simply keeps inputting into the filter from the first segment, and when the first segment finishes, one starts the second segment right away and continue inputting into the filter from the second segment, as shown in FIG. 7a.

Thus, there is a transition period, whereby each filter in the set 64 contains data from the first segment and data from the second segment. The result of combining these two data gives rise to a smooth path transition from the first segment and data from the second segment. The result of combining these two data gives rise to a smooth path transition from the first segment to the next segment for both the location and orientation Cartesian parts. The resultant path generated is shown in FIG. 7b. It can be shown that this path matches a cubic spline curve between the two line segments. Hence, the resultant path at the point of contact to the line segments are continuous to the second derivatives, giving rise to smooth path transition.

A common problem in acceleration/deceleration control is when it is desired to move along a sequence of very short segments without stopping. This problem is difficult and requires special handling when formula based methods are used for acceleration/deceleration control. However, the present method can handle this situation with ease. In fact, there is no need to do anything special. Just plan each segment by itself independent of future segments, when inputs from one segment ends, start the next segment right away. Hence, with the present method, it is possible to accelerate through a sequence of short segments to reach program velocity. And all this is achieved without any special handling in planning and interpolation compared to when the segments are long.

In applications, it if often required to adjust the shape of the robot path many times during the course of robot teaching and touchup. In most industrial robot controllers, this is commonly achieved by reteaching taught points along the path. This method of path adjustment is tedious. Furthermore, the resultant path changes as program speed changes. As shown in the "Corner Control" section below, the present method can be extended to provide simple corner control without reteaching taught points. With the present method, as explained above, the path corner is generated by the filter set 64, thus the corner can be adjusted by adjusting the input to the filter and/or the length of the filter dynamically. Again, this form of corner control is simple to implement and can be made independent of program speed changes. That is, once the user is done adjusting the corner, the same Cartesian path can be maintained even when program speed changes.

A property of each cascaded linear filter is that it is a FIR filter with finite duration. As explained in the "Non-symmetrical Acceleration/Deceleration Profiles" section below, this property can be exploited to dynamically change the filter lengths, so that different acceleration and deceleration times for the same segment can be obtained. This can be used for corner control as explained below.

PLANNING

The details of path planning can best be illustrated by considering the example of moving along a straight line from a start position $P_s$ to destination position $P_d$, with the specified location speed of $v_{prog}$ and orientation speed of $vrot_{prog}$.

First the positions $P_s$ and $P_d$ are converted into the standard 4×4 homogeneous transforms $T_s$ and $T_d$ with respect to the robot base frame, respectively. A general 4×4 homogeneous transforms has the following form, where the 3×3 matrix R represents the orientation part and the 3×1 vector l represents the location part:

$$T = \begin{bmatrix} R & l \\ O & 1 \end{bmatrix} \quad (1)$$

Path planning from $T_s$ to $T_d$ is divided into two parts, location planning and orientation planning. Location planning is straight forward. But for orientation part, there are many ways to control the transition from the start orientation $R_s$ to the destination orientation $R_d$. Three methods of orientation control is presented below.

Location Planning

Compute the difference vector dloc from start location $l_s$ to destination location $l_d$ $$dloc = l_d - l_s \quad (2)$$

where dloc is the interpolation parameter for the location part.

Orientation Planning

The objective is to move from $R_s$ to $R_d$. First compute the difference transform dR as $$dR = R_s^{-1} * R_d \quad (3)$$

As mentioned above, three different methods of orientation planning is presented below which are the one-angle method, two-angle method and three-angle method.

One-Angle Method

This is based on the fact that a rotation matrix R (3×3) can be expressed as the rotation of an angle $\theta$ about a unit vector v (3×1), that is, $$R = rot(v, \theta) \quad (4)$$

This conversion and vice versa can be found in standard robotic textbooks.

Multiplying the (scalar) rotation angle $\theta$ with vector v, one obtains an equivalent 3 component orientation representation, $$a = v * \theta \quad (5)$$

With this representation, convert 3×3 dR into (v,d$\theta$), and $R_s$ into $a_s$ an $R_d$ into $a_d$. Finally, compute, $$de = a_d - a_s \quad (6)$$

where de is used as the interpolation parameter for the one angle method.

Two-Angle Method

This method is based on expressing the 3×3 dR as two compound rotation transforms, i.e.

$$dR = Ra * Ro \quad (7)$$

Let the common normal between the approach vector (z-vector) of $R_s$ and $R_d$ be NV, then Ra is the rotation of this common normal NV by a certain angle $\theta$, i.e.

$$Ra = rot(NV, \theta) \quad (8)$$

Furthermore, by finding an angle $\psi$, the rotation of $\theta$ about the common normal NV can be expressed as:

$$Ra = rot(NV, \theta) = rot(z, \psi) rot(y, \theta) rot(z, -\psi) \quad (9)$$

Finally, Ro is simply $$R_o = rot(z, o) \quad (10)$$

The computation of $\psi$, $\theta$, o can be found in standard robotic textbooks. Using this method, the interpolation parameters are $\psi$, $\theta$, o.

Three-Angle Method

This method is based on representing a rotation matrix R in the following form, $$R = rot(z,\psi)rot(y,\theta)rot(z,o) \quad (11)$$

Again, the above conversion and vice versa can be found in standard robotic texts.

Using this method, choose a reference frame, e.g. robot base frame or other suitable frame, called $R_{ref}$. Expressing $R_s$ and $R_d$ with respect to this frame, i.e. compute:

$$R_{sref} = R_{ref}^{-1} * R_s \quad (12)$$

$$R_{dref} = R_{ref}^{-1} * R_d \quad (13)$$

Then find $(\psi_s, \theta_s, o_s)$ corresponding to $R_{sref}$, and find $(\psi_d, \theta_d, o_d)$ corresponding to $R_{dref}$, next compute the difference:

$$d\psi = \psi_d - \psi_s \quad (14)$$

$$d\theta = \theta_d - \theta_s \quad (15)$$

$$do = o_d - o_s \quad (16)$$

which then forms the interpolation parameters for this method.

Overall Planning

Having computed the interpolation parameters for the location and orientation parts in going from $T_s$ to $T_d$, next the time of travel for the segment is computed based on the specified location speed $v_{prog}$ and orientation speed $vrot_{prog}$.

Location Time

The location time is computed as $$tloc = \frac{mag(dloc)}{v_{prog}} \quad (17)$$

Orientation Time

For one-angle orientation control, the orientation time is computed as:

$$tornt = \frac{d\theta}{vrot_{prog}} \quad (18)$$

For two-angle orientation control, the orientation time is computed as:

$$tornt = \max\left[\frac{\theta}{vrot_{prog}}, \frac{\phi}{vrot_{prog}}\right] \quad (19)$$

For three-angle orientation control, the orientation time is computed as:

$$tornt = \max\left[\frac{d\psi}{vrot_{prog}}, \frac{d\theta}{vrot_{prog}}, \frac{d\phi}{vrot_{prog}}\right] \quad (20)$$

Segment Time

The overall travel time for the segment is simply the maximum of the location time and orientation time.

$$tseg = \max(tloc, tornt) \quad (21)$$

Next, the number of interpolation steps for this segment is computed as:

$$N = \frac{tseg}{\Delta T} \quad (22)$$

where $\Delta T$ is the interpolation period, i.e. the time that the interpolator block 40 runs in one loop.

Note that the above planning is based on constant user specified velocity.

Interpolation

The output of the planner is the segment time in number of interpolation steps N and a set of interpolation parameters for location and orientation interpolation. At the ith interpolation step, the intermediate Cartesian position $T_i$ is computed as follows. Similar to planning, runtime path interpolation is separated into location part an orientation part, that is $l_i$ and $R_i$ of $T_i$ are computed separately as follows.

Location Interpolation

Compute $l_i$ as $$l_i = l_s + (i/N)*dloc \quad (23)$$

Orientation Interpolation

Compute $R_i$ based on the orientation control method.

One-Angle Method

There is no need to compute $R_i$. The input to the orientation filters at each step is given by:

$$dei = \frac{de}{N} \quad (24)$$

Two-Angle Method

Compute $R_i$ as:

$$R_i = R_s * rot(NV,(i/N)\theta)*rot(z,(i/N)o) \quad (25)$$

Three-Angle Method

Compute $R_i$ as:

$$\psi_i = \psi_s + \frac{i}{N} d\psi \quad (26)$$

$$\theta_i = \theta_s + \frac{i}{N} d\theta \quad (27)$$

$$\phi_i = \phi_s + \frac{i}{N} d\phi \quad (28)$$

$$R_i = R_{ref}*rot(z,\psi_i)*rot(y,\theta_i)*rot(z,\phi_i) \quad (29)$$

Orientation Transformation Before Filter Input

As shown in FIG. 5a, the interpolation orientation matrix $R_i$ is converted into an equivalent 3×1 representation ai, before the input to the filter is computed. This conversion is done using the same approach outline in one-angle orientation planning method above, Equations (4) and (5).

Non-Symmetrical Acceleration/Deceleration Profiles

Figure 6:
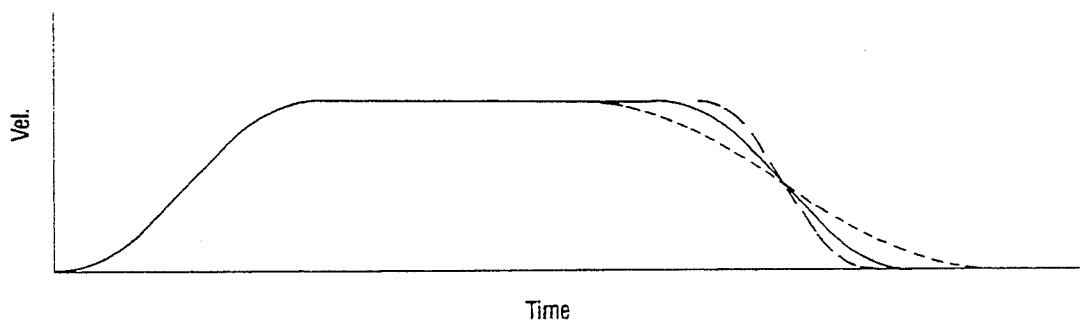
FIG. 6 is a graph of a non-symmetrical acceleration/deceleration profile that can be generated with cascaded linear filters of the present invention.

Another unique feature than can be added to the filter is that the deceleration time does not need to be the same as acceleration time. In other words, the acceleration profile and deceleration profile can be made unsymmetrical. This is illustrated in FIG. 6. This makes use of the fact that what goes into the filter eventually comes out. Hence, at any point in time the sum of filter outputs and internal filter values equals to the sum of filter inputs. After acceleration is over, it is easy to change filter from acceleration time parameters (i.e., F1, F2) to deceleration time parameters. The key point is to account for all the original internal filter values. Let the original internal filter values be C0, and with a new set of filter lengths for deceleration, it is straightforward to compute the internal filter values C1, then one needs to make the adjustment (C0−C1) into the input of the filter.

The ability to obtain non-symmetrical acceleration/deceleration profiles has several practical usage, one of which is described below.

Corner Control

With the above filter blending, the exact formula for corner distance dc in FIG. 7b can be derived as:

$$d_c = K * V_b * T * Sin\left(\frac{\beta}{2}\right) \quad (30)$$

where K is a constant depending on the ratio of F2 to F1, $v_b$ is the speed at the-blending region, T is F1+F2 at the blending region, and $\beta$ is the angle between the line unit vectors.

Equation (30) shows that the corner distance is a function of (i) velocity during blending, (ii) acceleration time (=deceleration time) during segment blending and (iii) the angle between the line segments. Given a taught robot program, the angle between the line segments is fixed. Hence, to change corner distance, one can (i) change the speed, and/or (ii) change the filter length, during blending. It is important to note that one can achieve corner rounding adjustment this way without changing taught positions in the program. This is a big savings in path touch up time in typical applications.

FIG. 8b shows corner adjustment with corner speed alone, i.e. T remains constant in Equation (30). Given corner distance, $d_c$, compute corner speed, $v_b$, from (30). Plan the given segment with this corner speed during blending (i.e. T), and the non-blending region with program speed. An example of this is shown as solid lines in FIG. 8b (which shows 1 of the 6 filters). The key idea is to change from program speed to the desired corner speed, $v_b$, such that blending occurs with this desired corner speed and the desired duration T giving the desired corner distance, $d_c$. The area under the solid curve represent the distance of the line segment. In FIG. 8a, the dotted lines show the corner rounding obtained with program velocity. In FIG. 8a, the solid line corresponds to the path obtained based on the velocity profile of FIG. 8b. It is noted that the algorithm is computationally efficient and robust.

Furthermore with this method, the user interface 36 can be made simple. By specifying a global corner speed whereby all corner blending uses this speed, then the same corners are maintained regardless of program speed changes. This is an important feature, the ability to maintain the same path regardless of program speed changes. Note that such a global corner speed provides a global adjustment that affects the entire program. In addition to this global adjustment, it is straightforward to add local adjustment by providing local adjustment factors affecting only each motion line in the program.

FIG. 8c shows how the same (solid) corner path can be obtained by changing blend filter lengths, i.e. given $d_c$, with corner speed, $v_b$, equal to program speed, compute T (which is the filter length) from Equation (30). The same corners can be maintained by switching to this filter length T during corner blending. Obviously, when filter length is reduced, the maximum acceleration during blending increases. Hence, acceleration can be used to limit how short the filter length can be. With filter length limited, blend speed can be adjusted further to achieve the desired corner distance.

While the best mode for carrying out the invention has been described in detail, those familiar with the art to which this invention relates will recognize various alternative designs and embodiments for practicing the invention as defined by the following claims.

What is claimed is:

1. A method for planning a path for a device in Cartesian space having a plurality of Cartesian components, the device being movable along axes defining an axis space, the method comprising the steps of:

(a) receiving a first motion command from a user program, the motion command having desired motion-type information in the Cartesian space, and also having position and velocity information, the position, velocity and motion-type information defining a desired path;

(b) setting a constant velocity parameter based upon the velocity information;

(c) planning a set of interpolation parameters based on the position, velocity and motion-type information and based upon the constant velocity parameter;

(d) computing a plurality of intermediate Cartesian positions including location and orientation components based upon the interpolation parameters, the intermediate Cartesian positions being on the desired path;

(e) transforming the orientation components of the intermediate Cartesian positions into transformed orientation components;

(f) smoothing the location components and the transformed orientation components into smoothed location and smoothed transformed orientation components;

(g) inverse transforming the smoothed transformed orientation components into inverse transformed orientation components; and (h) generating a plurality of commands in the axis space based upon the smoothed location components and the inverse transformed orientation components.

2. The method of claim 1 wherein the step of smoothing is accomplished with a plurality of cascaded linear filters, each of the cascaded linear filters corresponding to a respective Cartesian component.

3. The method of claim 2 wherein each cascaded linear filter has the same filter lengths.

4. The method of claim 2 wherein each of the cascaded linear filters has two-stages.

5. The method of claim 4 wherein each of the stages includes a shift register.

6. The method of claim 2 further comprising the steps of receiving a second motion command from the user program and blending the first and second motion commands by performing the steps (b)–(h) on the second motion command immediately after the steps (b)–(h) on the first motion command are completed, whereby the blending is achieved by the operation of the cascaded linear filters and the blended motion commands define a corner distance.

7. The method as claimed in claim 6 further comprising the step of modifying the location components and the transformed orientation components to the cascaded linear filters during the step of blending to thereby modify speed during blending wherein the corner distance is adjusted.

8. The method as claimed in claim 6 or claim 7 further comprising the step of modifying the length of the cascaded linear filters, whereby the duration in which blending occurs is modified and the corner distance is adjusted.

9. A system for planning a path for a device in Cartesian space having a plurality of Cartesian components, the device being movable along axes defining an axis space, the system comprising:
means for receiving a first motion command from a user program, the motion command having desired motion-type information in the Cartesian space, and also having position and velocity information, the position,
velocity and motion-type information defining a desired path;
means for setting a constant velocity parameter based upon the velocity information;
means for planning a set of interpolation parameters based on the position, velocity and motion-type information and based upon the constant velocity parameter;
means for computing a plurality of intermediate Cartesian positions including location and orientation components based upon the interpolation parameters, the intermediate Cartesian positions being on the desired path;
means for transforming the orientation components of the intermediate Cartesian positions into transformed orientation components;
means for smoothing the location components and the transformed orientation components into smoothed location and smoothed transformed orientation components;
means for inverse transforming the smoothed transformed orientation components into inverse transformed orientation components; and
means for generating a plurality of commands in the axis space based upon the smoothed location components and the inverse transformed orientation components.

10. The system of claim 9 wherein the means for smoothing includes a plurality of cascaded linear filters, each of the cascaded linear filters corresponding to a respective Cartesian component.

11. The system of claim 10 wherein each cascaded linear filter has the same filter lengths.

12. The system of claim 10 wherein each of the cascaded linear filters has two-stages.

13. The system of claim 12 wherein each of the stages includes a shift register.

14. The system of claim 10 further comprising means for receiving a second motion command from the user program and means for blending the first and second motion commands, whereby the blending is achieved by the operation of the cascaded linear filters and the blended motion commands define a corner distance.

15. The system as claimed in claim 14 further comprising means for modifying the location components and the transformed orientation components to the cascaded linear filters during blending to thereby modify speed during blending wherein the corner distance is adjusted.

16. The system as claimed in claim 14 or claim 15 further comprising means for modifying the length of the cascaded linear filters, whereby the duration in which blending occurs is modified and the corner distance is adjusted.

* * * * *